United States Patent
Kim

(10) Patent No.: US 7,256,857 B2
(45) Date of Patent: Aug. 14, 2007

(54) LIQUID CRYSTAL DISPLAY FOR EQUIVALENT RESISTANCE WIRING

(75) Inventor: Hong Jin Kim, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/167,099

(22) Filed: Jun. 28, 2005

(65) Prior Publication Data

US 2005/0237468 A1 Oct. 27, 2005

Related U.S. Application Data

(62) Division of application No. 09/893,555, filed on Jun. 29, 2001.

(30) Foreign Application Priority Data

Oct. 17, 2000 (KR) ............... 2000-61104
Jun. 27, 2001 (KR) ............... 2001-37133

(51) Int. Cl.
*G02F 1/1343* (2006.01)
*G02F 1/1345* (2006.01)

(52) U.S. Cl. .............. 349/148; 349/139; 349/149

(58) Field of Classification Search ............ 349/152, 349/54, 148, 139, 149
See application file for complete search history.

(56) References Cited

U.S. PATENT DOCUMENTS

| | | | |
|---|---|---|---|
| 4,586,789 A * | 5/1986 | Kishimoto et al. ........ 349/152 |
| 5,499,131 A | 3/1996 | Kim | |
| 5,757,450 A | 5/1998 | Fujii et al. | |
| 5,811,318 A * | 9/1998 | Kweon ................. 438/30 |
| 5,825,439 A * | 10/1998 | Noriyama ............. 349/54 |
| 5,825,450 A * | 10/1998 | Date et al. ............ 349/149 |
| 5,870,163 A | 2/1999 | Watanabe et al. | |
| 5,982,470 A | 11/1999 | Nakahara et al. | |
| 6,052,169 A * | 4/2000 | Kim .................... 349/148 |
| 6,104,465 A | 8/2000 | Na et al. | |
| 6,630,686 B1 * | 10/2003 | Kim .................... 257/72 |
| 6,700,636 B2 * | 3/2004 | Kim et al. ............ 349/139 |

FOREIGN PATENT DOCUMENTS

JP    401152425 A  *  6/1989
JP    08-160444        6/1996

(Continued)

OTHER PUBLICATIONS

German Patent and Trademark Office Communication dated Apr. 26, 2004.

*Primary Examiner*—Huyen Ngo
(74) *Attorney, Agent, or Firm*—McKenna Long & Aldridge LLP

(57) ABSTRACT

A liquid crystal display having an electrode pad for compensating for differences in resistance of electrode links. A pad portion in contact with a driving circuit includes a transparent electrode pattern having a length that depends on the length of an associated electrode link that is connected between the pad portion and a corresponding signal line at a pixel area on which a plurality of liquid crystal cells are arranged. Accordingly, resistance differences that depend on the length of the electrode links are compensated for using electrode pads, thereby making signal conductors with substantially equal resistances.

2 Claims, 9 Drawing Sheets

FOREIGN PATENT DOCUMENTS

| | | |
|---|---|---|
| JP | 08-297291 | 11/1996 |
| JP | 11-327464 | 11/1996 |
| JP | 10-339880 | 12/1998 |
| JP | 2000-221540 | 8/2000 |
| WO | WO97/00462 | 1/1997 |

* cited by examiner

1

LIQUID CRYSTAL DISPLAY FOR EQUIVALENT RESISTANCE WIRING

CROSS REFERENCE

This application is a divisional of U.S. application Ser. No.: 09/893,555, filed Jun. 29, 2001, which claims the benefit of Korean Patent Application Nos. P2000-61104 and P2001-37133, filed on 17 Oct. 2000 and 27 Jun. 2001 under 35 U.S.C. § 119, each of which are hereby incorporated by reference for all purposes as if fully set forth herein.

BACKGROUND OF THE INVENTION

1. Field of the Invention

This invention relates to liquid crystal displays, and more particularly to liquid crystal displays wherein resistance differences caused by electrode link length differences are substantially eliminated.

2. Description of the Related Art

Generally, a liquid crystal display (LCD) controls light transmissivity using electric fields to display a picture corresponding to video signals. To this end, the LCD includes a liquid crystal display panel having liquid crystal cells arranged in a matrix, and driving circuitry for driving the liquid crystal display panel.

In a liquid crystal display panel, gate lines and data lines are arranged such that they cross each other. The liquid crystal cells are located in the areas defined by the crossing lines. The liquid crystal display panel includes pixel electrodes and a common electrode for applying electric fields to the liquid crystal cells. Each pixel electrode is connected, via source and drain electrodes of a switching thin film transistor, to a data line. The gate electrode of the switching thin film transistor is connected a gate line. By selectively applying appropriate signals to the various data and gate lines, a desired pixel voltage signal can be applied to each pixel electrode.

The driving circuitry includes gate drivers for driving the gate lines, data drivers for driving the data lines, and a common voltage generator for driving the common electrode. The gate drivers sequentially apply scanning signals (or gate signals) to the gate lines, which causes a row of thin film transistors with gates connected to a particular gate line to be driven. The data drivers sequentially apply data voltage signals to data lines, which causes a column of thin film transistors having electrodes connected to a particular data line to be driven. The common voltage generator applies a common voltage signal to the common electrode. Accordingly, the liquid crystal element driven by both a scanning signal and a data voltage signal is enabled. An electric field is then applied between the pixel electrode of that liquid crystal element and the common electrode, causing the light transmissivity to change in accordance with the data voltage signal, causing a pixel to be displayed.

The driving circuitry usually takes the form of chips that are mounted on tape carrier packages (TCP) of a tape automated bonding (TAB) system. The TCPs connect to electrode pads provided on a liquid crystal display panel. The electrode pads in turn connect via electrode links to signal lines at a pixel area. Thus, the driving circuitry electrically connects to the signal lines at a pixel area.

In an LCD, as the number of pixels increase to form a high-resolution picture, the available conductor width and conductor spacing becomes very small. Furthermore, a high integrated density of driving circuits in a PDA (Personal Digital Assistant) employing a small liquid crystal device of below 6 inch enforces the pad spacing to be very small. As a consequence and as shown in FIG. 1, the electrode links between the electrode pads and the signal lines at the pixel area have lengths that vary in accordance with their positions. Since conductor resistance depends on conductor length, the electrode links have resistance that vary in accord with position.

FIG. 1 also shows an electrode arrangement of a gate pad-link portion in a conventional LCD. In FIG. 1, a gate pad 12 connected to a gate driving circuit (not shown) is provided at an edge portion of a lower substrate 10. The gate pad 12 applies a driving signal from the gate driving circuit, via a gate link GK, to a gate line GL that is arranged at a pixel area.

The gate pad 12 has a structure as shown in FIG. 2 and in FIG. 3. The gate pad 12 includes a gate pattern 16 formed on a substrate 26, a gate insulating film 22, and a protective film 24. The gate pattern, gate insulating film, and protective film are sequentially disposed on the substrate 26. An opening in the gate insulating film 22 and protective film 24 exposes a pad area of the gate pattern 16. A transparent electrode pattern 18 is in contact with the exposed gate pattern 16. That transparent electrode pattern 18 is also in electrical contact with the TCP having the driving circuit via a contact portion 20, shown in FIG. 2.

Turning back to FIG. 1, the gate links GK have lengths that depend on their positions, whereas they have the same width and thickness. Accordingly, the resistances of adjacent gate links GK only have a small difference. However, a large resistive difference exists between the 'A' portion, where the gate link lengths are relatively small, and the 'B' portion, where the gate link lengths are relatively large. As a result, the gate signals applied to the gate lines GL are distorted, causing picture quality deterioration.

Similarly, the data links between the data pads and the data electrodes also have a resistive difference according to the wire length. This resistive difference causes a distortion of the data signals applied to the data lines, which causes picture quality deterioration.

Therefore, a display having little or no differences in the resistances of gate links and/or of data links would be beneficial.

SUMMARY OF THE INVENTION

Accordingly, it is an object of the present invention to provide a liquid crystal display wherein resistive differences based on the length of electrode links is compensated for to produce signal conductors having equivalent resistances.

To achieve these and other objects of the invention, a liquid crystal display according to an aspect of the present invention includes: a pixel area; a driving circuit; at least two electrode links each extended from the pixel area; and at least two pad members in contact with the driving circuit and the electrode links, each pad members having a different size in accordance with a length of the electrode link.

A liquid crystal display according to another aspect of the present invention includes: a pixel area; a driving circuit; at least two electrode links each extended from the pixel area; and at least two pad members in contact with the driving circuit and the electrode links, the pad members having a different non-resistivity in accordance with a length of the electrode link.

A liquid crystal display according to still another aspect of the present invention includes: a pixel area; a driving circuit; at least two electrode links each extended from the pixel area, the electrode links having lengths different from each other; and at least two pad members in contact with the driving circuit and the electrode links, wherein the electrode links are different from each other in a width.

A liquid crystal display according to still another aspect of the present invention includes: a pixel area; a driving circuit; at least two electrode links each extended from the pixel area, the electrode links having lengths different from each other; and at least two pad members in contact with the driving circuit and the electrode links, wherein the electrode links are different from each other in a non-resistivity.

A liquid crystal display according to still another aspect of the present invention includes: a pixel area; a driving circuit; at least two electrode links each extended from the pixel area, the electrode links having lengths different from each other; at least two pad members in contact with the driving circuit and the electrode links; and at least two patterns for compensating a resistance difference due to a length difference between the electrode links.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE ILLUSTRATED EMBODIMENT

Figure 4A:
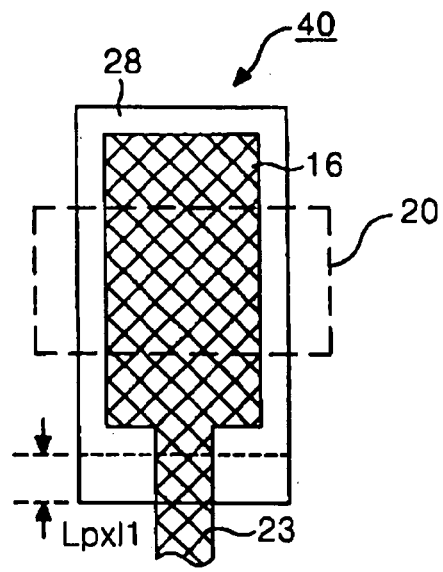
FIG. 4A and FIG. 4B are plan views showing a structure of a gate pad according to an embodiment of the present invention.
Figure 4B:
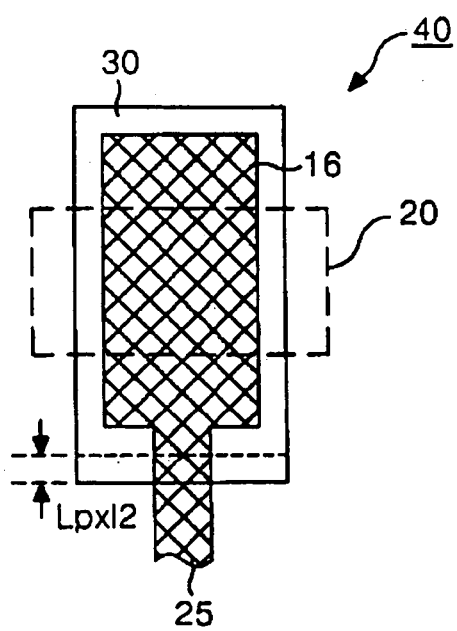

Referring now to FIG. 4A and FIG. 4B, there is shown a pad 40, which can be a data pad or a gate pad, according to the principles of the present invention. The pad 40 is connected to an electrode link 23 having a relatively long length. As can be seen from FIG. 4A, the length of a transparent electrode 28 overlapping and in contact with a pattern 16 is lengthened over the prior art by a length Lpxl1 the extends in the pixel area direction. As the unit area contact resistance between the pattern 16 and the transparent electrode 28 is relatively high, lengthening the transparent electrode 28 by the length Lpxl1 increases the contact area, reduces the contact resistance, and compensates for the relatively high resistance of the relatively long electrode link 23.

The pad shown in FIG. 4B is connected to an electrode link 25 having a relatively small length. As can be seen from FIG. 4B, the length of the transparent electrode 30 is lengthened by a distance Lpxl2, which is less than the distance Lpxl1. Lengthening the transparent electrode 30 by Lpxl2 increases the contact area somewhat, correspondingly reduces the contact resistance, and compensates for the resistance of the electrode link 25 having a relatively small length.

An additional length of the pad, that is, the transparent electrode patterns 28 or 30 compensates for a resistance difference according to the length of the electrode link to make a signal wire having an equivalent resistance determined by the following formula:

$$Lpxl = (Ravg \times Tpxl \times Wpxl)/\rho pxl$$

Where Lpxl represents an additional length of the transparent electrode pattern 28 or 30, Ravg represents an average resistance of the link, Tpxl represents the thickness of the transparent electrode pattern (28 or 30), Wpxl represents a width of the transparent electrode pattern 28 or 30, and ρ represents a non-resistance value of the transparent electrode pattern 28 or 30.

Figure 1:
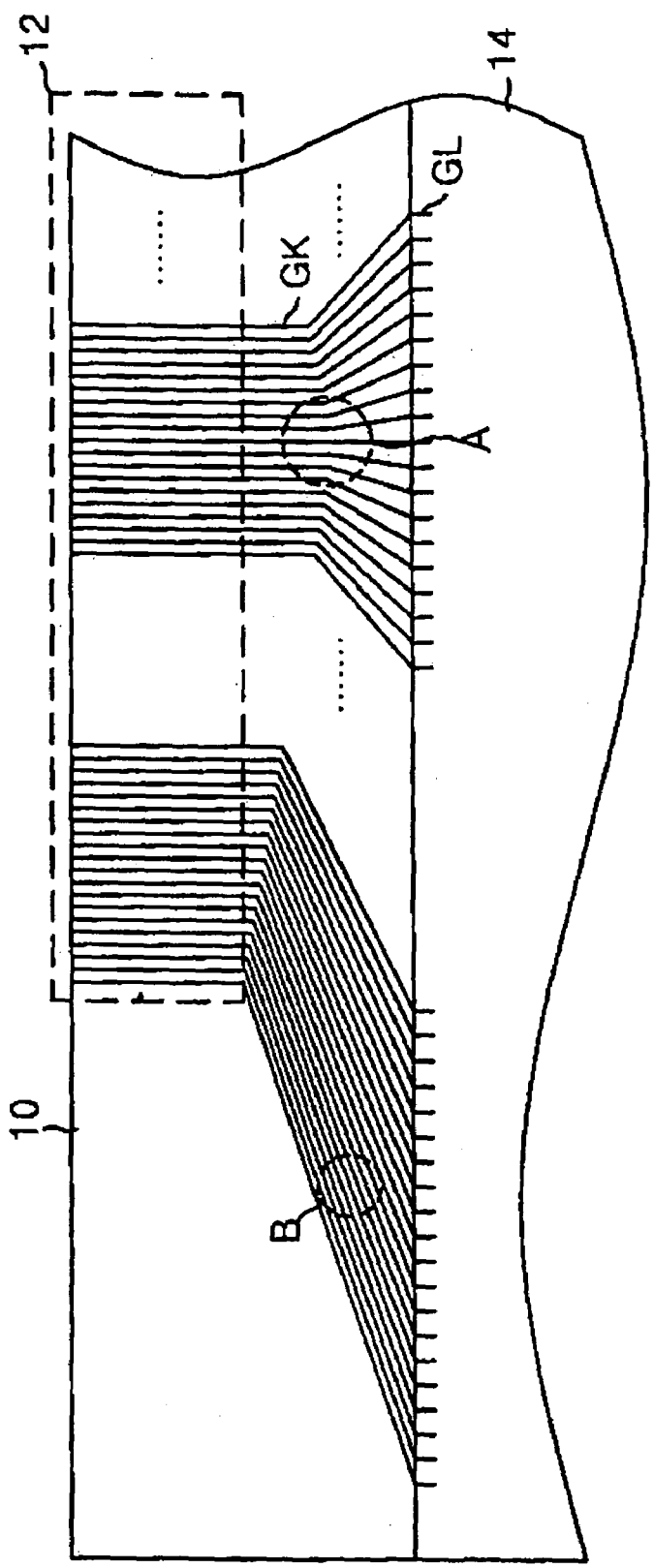
FIG. 1 is a plan view showing a gate pad-link part in a conventional liquid crystal display.
Figure 2:
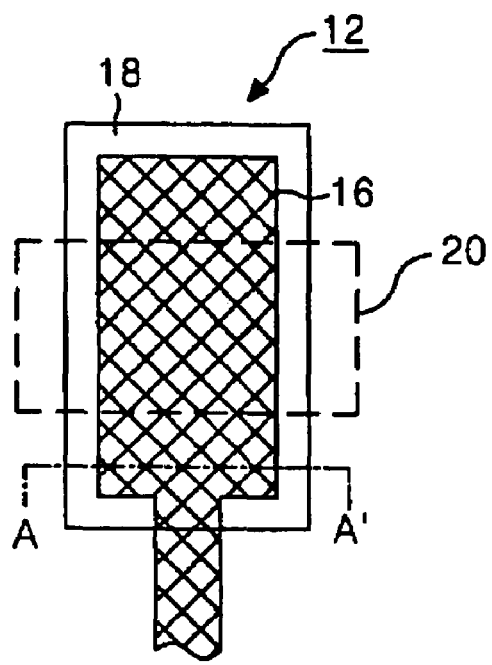
FIG. 2 is a detailed plan view of the gate pad shown in FIG. 1.
Figure 3:
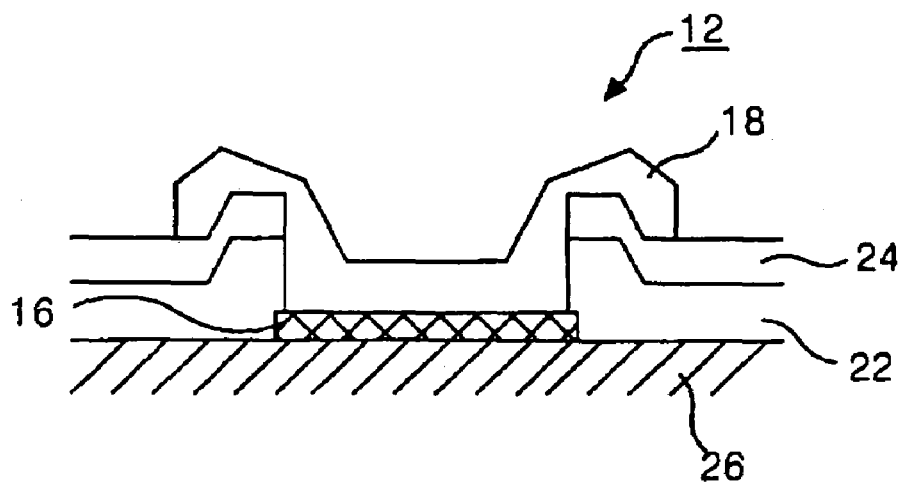
FIG. 3 is a section view of the gate pad taken along the A-A' line in FIG. 2.

If the transparent electrode pattern 28 or 30 is formed on a basis of an additional length Lpxl1 or Lpxl2 of the transparent electrode pattern 28 or 30 of the pad determined by the above formula, then it is possible to compensate for a resistance difference according to the length of the electrode link 23 or 25, thereby forming signal conductors having the same resistance. The large resistance of a long electrode link 23 can be compensated by increasing the length of the transparent electrode pattern 28 in the pixel direction by a relatively large length. On the other hand, the small resistance value of a short electrode link 25 can be compensating by only slightly increasing the length of the transparent electrode pattern 30. The sectional structure of a pad portion having the transparent electrode pattern 28 or 30 is as shown in FIG. 3. The transparent electrode pattern 28 or 30 contacts a pad portion (not shown), which is provided to a TCP (Tape Carrier Package) loaded with a driving circuit, through the contact area 20, as shown in FIGS. 4A and 4B.

Again, the electrode pad structure described above can be used to compensate for resistance differences in both data links and gate lengths.

Figure 5A:
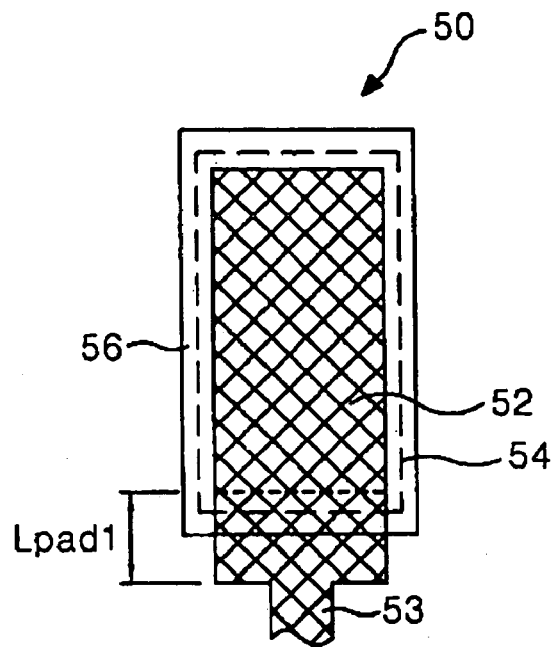
FIG. 5A and FIG. 5B are plan views showing a structure of a pad according to a second embodiment of the present invention.
Figure 5B:
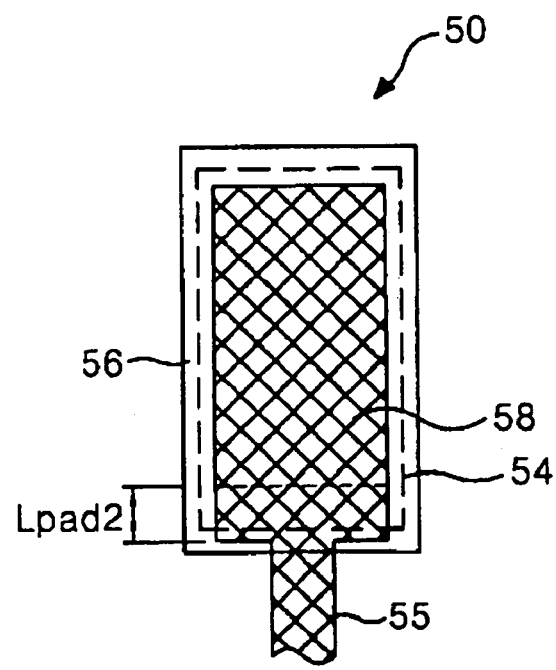

FIGS. 5A and 5B show a pad 50 according to a second embodiment of the present invention. The pad 50 is connected to an electrode link 53 having a relatively long length. As can be seen from FIG. 5A, the length of an electrode pad 52 being in contact with a transparent electrode 56 is enlarged by Lpad1 in the pixel area direction. This aims to compensate for a relatively large resistance value loaded on a relatively long electrode link 53, and enlarges an length of the electrode pad 52 to reduce a large resistance value of the pad portion 50. The transparent electrode 56 is in contact with a pad portion (not shown), which is provided to a TCP (Tape Carrier Package) loaded with a driving circuit, through the contact area 54.

The pad 50 shown in FIG. 5B is connected to an electrode link 55 having a relatively small length. As can be seen from FIG. 5B, the length of the electrode pad 58 is enlarged by a distance Lpad2, which is less than the distance Lpad1. Lengthening the electrode pad 58 by Lpad2 reduces the resistance, and compensates for resistance of the electrode link 55 having a relatively small length. The transparent electrode 56 is in contact with a pad portion (not shown), which is provided to a TCP (Tape Carrier Package) loaded with a driving circuit, through the contact area 54 as shown in FIGS. 5A and 5B.

An additional length of the electrode pad 52 or 58, that is, the electrode pad pattern 52 or 58 compensates for a resistance difference according to the length of the electrode link 53 or 55 to make a signal wire having an equivalent resistance.

If the electrode pad pattern 52 or 58 is formed on a basis of an additional length Lpad1 or Lpad2 of the electrode pad pattern 52 or 58 of the pad portion 50, then it is possible to compensate for a resistance difference according to the length of the electrode link, thereby forming signal conductors having the same resistance. The large resistance of a long electrode link can be compensated by increasing the length of the electrode pad pattern 52 in pixel direction by a relatively large length. On the other hand, the small resistance value of a short electrode link can be compensating by only slightly increasing the length of the electrode pad pattern 58.

Figure 6A:
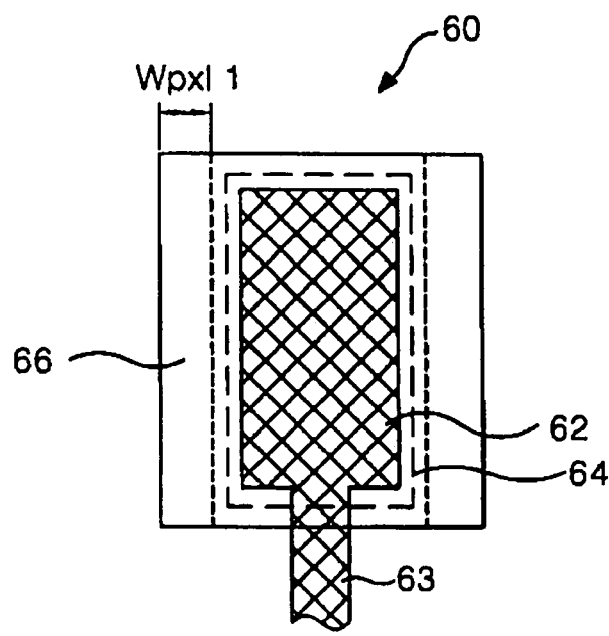
FIG. 6A and FIG. 6B are plan views showing a structure of a pad according to a third embodiment of the present invention.
Figure 6B:
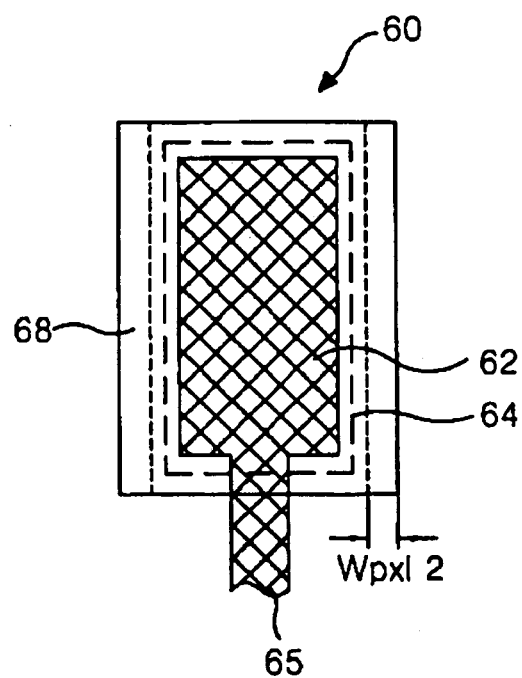

Referring to FIGS. 6A and 6B, there is illustrated a pad 60 according to a third embodiment of the present invention. The pad 60 is connected to an electrode link 63 having a relatively long length. As can be seen from FIG. 6A, the width of a transparent electrode 66 being in contact with an electrode pad 62 is enlarged by Wpxl1. This aims to compensate for a relatively large resistance value loaded on a relatively long electrode link 63, and enlarges an width of the transparent electrode 66 to reduce a large resistance value of the pad 60. The transparent electrode 66 is in contact with a pad portion (not shown), which is provided to a TCP (Tape Carrier Package) loaded with a driving circuit, through the contact area 64.

The pad 60 shown in FIG. 6B is connected to a electrode link 65 having a relatively small length. As can be seen from FIG. 6B, the width of the transparent electrode 68 is enlarged by a width Wpxl2, which is less than the distance Wpxl1. Enlarging the transparent electrode 68 by Wpxl2 reduces the resistance of the pad 60, and compensates for resistance of the electrode link 65 having a relatively small length. The transparent electrode 68 is in contact with a pad portion (not shown), which is provided to a TCP (Tape Carrier Package) loaded with a driving circuit, through the contact area 64.

An additional width of the transparent electrode 66 or 68, that is, the transparent electrode pattern 66 or 68 compensates for a resistance difference according to the length of the electrode link 63 or 65 to make a signal wire having an equivalent resistance.

If the transparent electrode pattern 66 or 68 is formed on a basis of an additional width Wpxl1 or Wpxl2 of the transparent electrode pattern 66 or 68 of the pad 60, then it is possible to compensate for a resistance difference according to the length of the electrode link, thereby forming signal conductors having the same resistance. The large resistance of a long electrode link can be compensated by increasing the width of the transparent electrode pattern 66 by a relatively large width. On the other hand, the small resistance value of a short electrode link 65 can be compensated by only slightly increasing the width of the transparent electrode pattern 68.

Figure 7A:
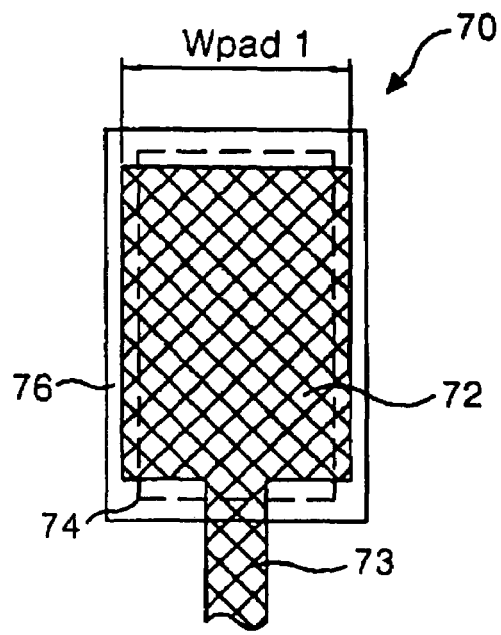
FIG. 7A and FIG. 7B are plan views showing a structure of a pad according to a fourth embodiment of the present invention.
Figure 7B:
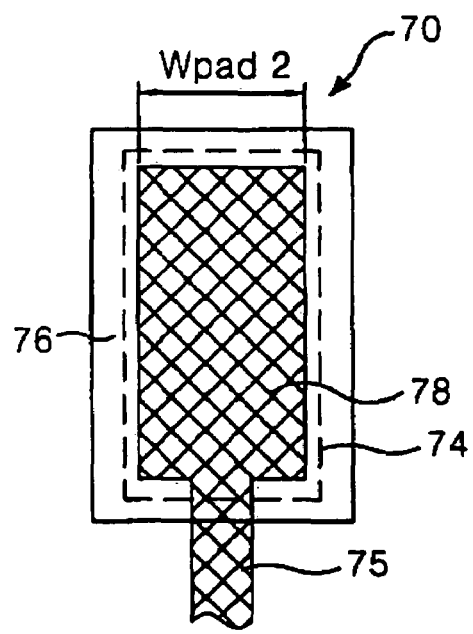

FIGS. 7A and 7B show a pad 70 according to a fourth embodiment of the present invention. The pad 70 is connected to an electrode link 73 having a relatively long length. As can be seen from FIG. 7A, the width of an electrode pad 72 being in contact with a transparent electrode 76 is enlarged to have a width of Wpad1. This aims to compensate for a relatively large resistance value loaded on a relatively long electrode link 73, and enlarges a width of the electrode pad 72 to reduce a large resistance value of the pad 70. The transparent electrode 76 is in contact with a pad portion (not shown), which is provided to a TCP (Tape Carrier Package) loaded with a driving circuit, through the contact area 74.

The pad 70 shown in FIG. 7B is connected to an electrode link 75 having a relatively small length. As can be seen from FIG. 7B, the electrode pad 78 becomes small in a width Wpad2 which is less than the width Wpad1. Controlling the width of the electrode pad 78 in a value of Wpad2 reduces the resistance, and compensates for resistance of the electrode link 75 having a relatively small length. The transparent electrode 76 is in contact with a pad portion (not shown), which is provided to a TCP (Tape Carrier Package) loaded with a driving circuit, through the contact area 74.

A controlled width of the electrode pad 72 or 78, that is, the electrode pad pattern 72 or 78 compensates for a resistance difference according to the length of the electrode link 73 or 75 to make a signal wire having an equivalent resistance.

If the electrode pad pattern 72 or 78 is formed on a basis of a controlled width Wpad1 or Wpad2 of the electrode pad pattern 72 or 78 of the pad 70, then it is possible to compensate for a resistance difference according to the length of the electrode link 73 or 78, thereby forming signal conductors having the same resistance. The large resistance of a long electrode link can be compensated by increasing the width of the electrode pad pattern 72 by a relatively large length. Oh the other hand, the small resistance value of a short electrode link can be compensating by only slightly increasing or decreasing the width of the electrode pad pattern 78.

Figure 8A:
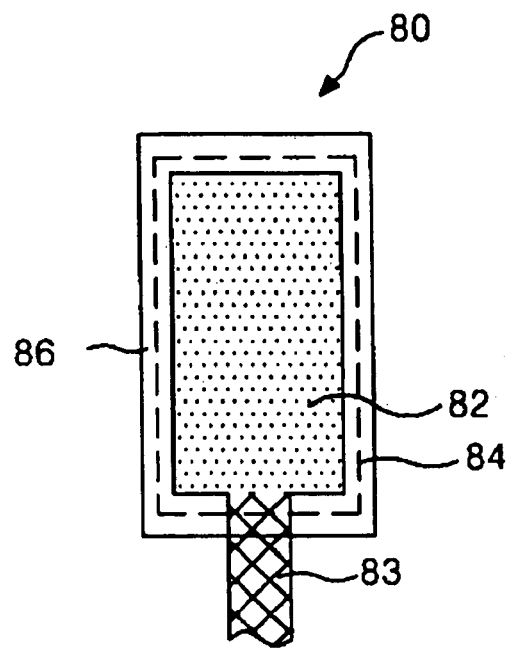
FIG. 8A and FIG. 8B are plan views showing a structure of a pad according to a fifth embodiment of the present invention.
Figure 8B:
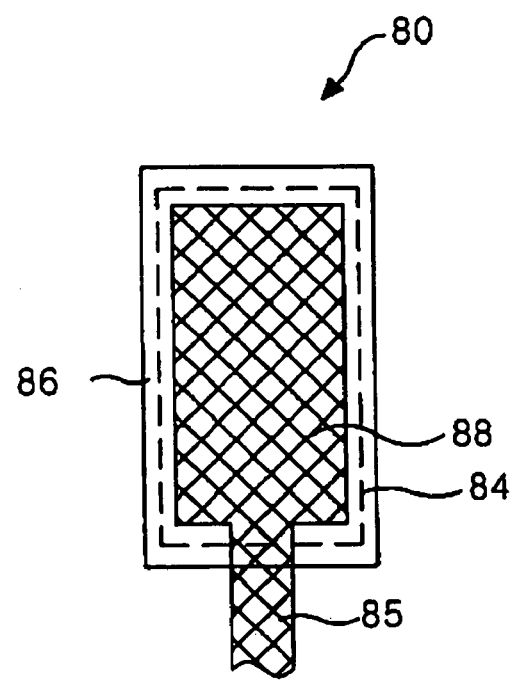

Referring to FIGS. 8A and 8B show a pad 80 according to a fifth embodiment of the present invention. The pad 80 is connected to an electrode link 83 having a relatively long length. As can be seen from FIG. 8A, an electrode pad 82 being in contact with a transparent electrode 86 is formed by a conductive material having a relatively low non-resistivity (or conductivity) $\rho 1$. This aims to compensate for a relatively large resistance value loaded on a relatively long electrode link 83, and reduce a large resistance value of the pad portion 80. The transparent electrode 86 is in contact with a pad portion (not shown), which is provided to a TCP (Tape Carrier Package) loaded with a driving circuit, through the contact area 84. Furthermore, in the case of that the transparent electrode 86 is formed by a transparent material having a relatively low non-resistivity $\rho 1$, the relatively large resistance value loaded on the relatively long electrode link 83 can be compensated.

The pad 80 shown in FIG. 8B is connected to an electrode link 85 having a relatively short length. As can be seen from FIG. 8B, a electrode pad 88 is formed by a conductive material having a non-resistivity $\rho 2$, which is higher than the non-resistivity $\rho 1$. Selecting the electrode pad material 88 having the non-resistivity $\rho 2$ reduces the resistance and compensates for resistance of the electrode link 85 having a relatively small length. The transparent electrode 86 is in contact with a pad portion (not shown), which is provided to a TCP (Tape Carrier Package) loaded with a driving circuit, through the contact area 84. On the other hand, if the transparent electrode 86 is formed a transparent material having the non-resistivity ρ2, the relatively small resistance value loaded on the relatively short electrode link 85 can be compensated.

The selective non-resistivity of electrode pad 82 or 88, that is, the electrode pad material 82 or 88 compensates for a resistance difference according to the length of the electrode link 83 or 85 to make a signal wire having an equivalent resistance.

If the electrode pad pattern 82 or 88 is formed on a basis of a selective non-resistivity ρ1 or ρ2, then it is possible to compensate for a resistance difference according to the length of the electrode link 83 or 85, thereby forming signal conductors having the same resistance. The large resistance of a long electrode link can be compensated by forming the electrode pad pattern 82 by a relatively low non-resistivity of conductive material. On the other hand, the small resistance value of a short electrode link can be compensating by only slightly forming the electrode pad pattern 88 by a slightly low non-resistivity of conductive material.

Figure 9A:
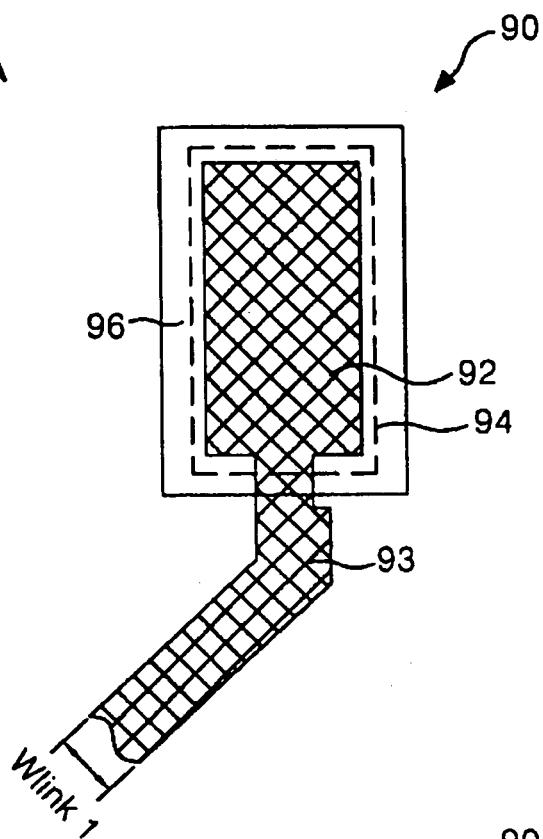
FIG. 9A and FIG. 9B are plan views showing a structure of a electrode link according to an embodiment of the present invention.
Figure 9B:
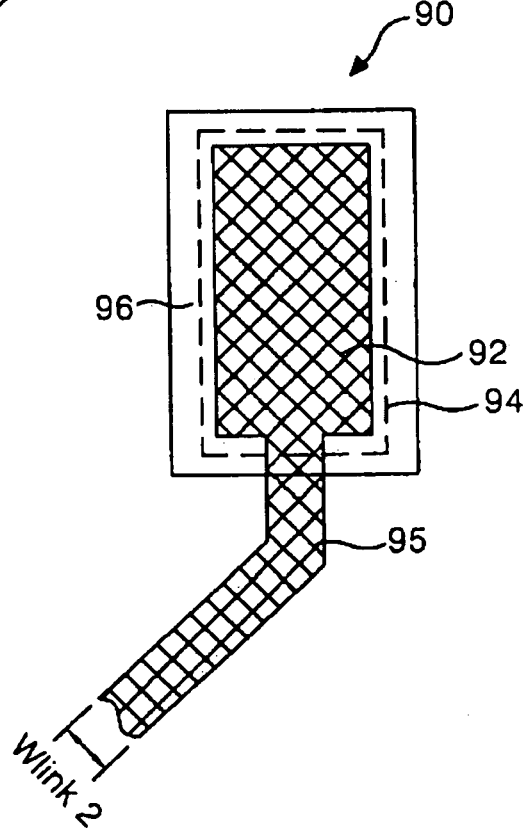

Referring to FIGS. 9A and 9B, there is shown an electrode link 93 and 95 according to a first embodiment of the present invention. In FIG. 9A, the electrode link 93 being connected to an electrode pad 92 included in a pad 90 has a relatively long length. The electrode link 93 is formed to have a width Wlink1 wider than that of the prior art. This aims to compensate for a relatively large resistance value loaded on a relatively long electrode link 93, and reduce a large resistance value of the pad link 93. The transparent electrode 96 is in contact with a pad portion (not shown), which is provided to a TCP (Tape Carrier Package) loaded with a driving circuit, through the contact area 94.

The pad link 95 shown in FIG. 9B being connected to the electrode pad 92 has a relatively short length. As can be seen from FIG. 9B, a electrode link 85 is formed to have a width which is less than the width Wlink1. Controlling the width of the electrode link 95 in the Wlink2 reduces the resistance and compensates for the resistance of the electrode link 95 having a relatively short length.

The controlled width of the electrode link 95, that is, the electrode link pattern 93 or 95 compensates for a resistance difference according to the length of the electrode link 93 or 95 to make a signal wire having an equivalent resistance.

If the electrode link pattern 93 or 95 is formed on a basis of a controlled width Wlink1 or Wlink2, then it is possible to compensate for a resistance difference according to the length of the electrode link 93 or 95, thereby forming signal conductors having the same resistance. The large resistance of a long electrode link can be compensated by forming the electrode link pattern 93 in a relatively wide width Wlink1. On the other hand, the small resistance value of a short electrode link can be compensating by only forming the electrode link pattern 95 in a slightly wide width Wlink2.

Figure 10A:
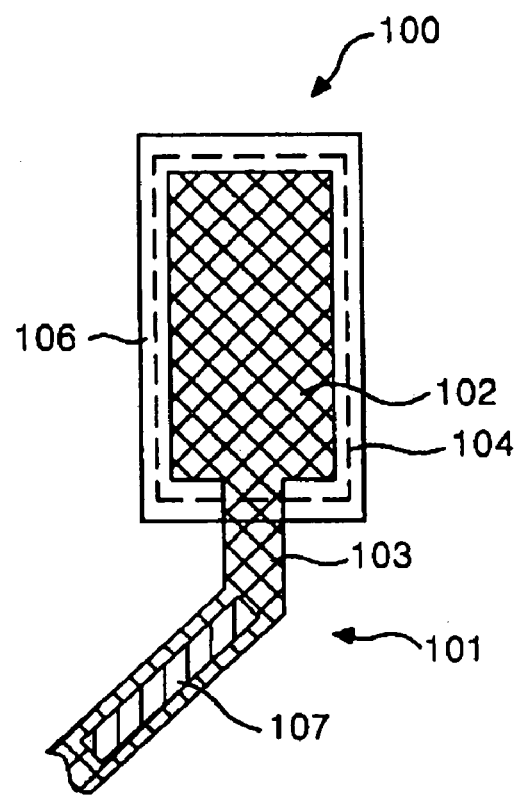
FIG. 10A and FIG. 10B are plan views showing a structure of a link according to an embodiment of the present invention.
Figure 10B:
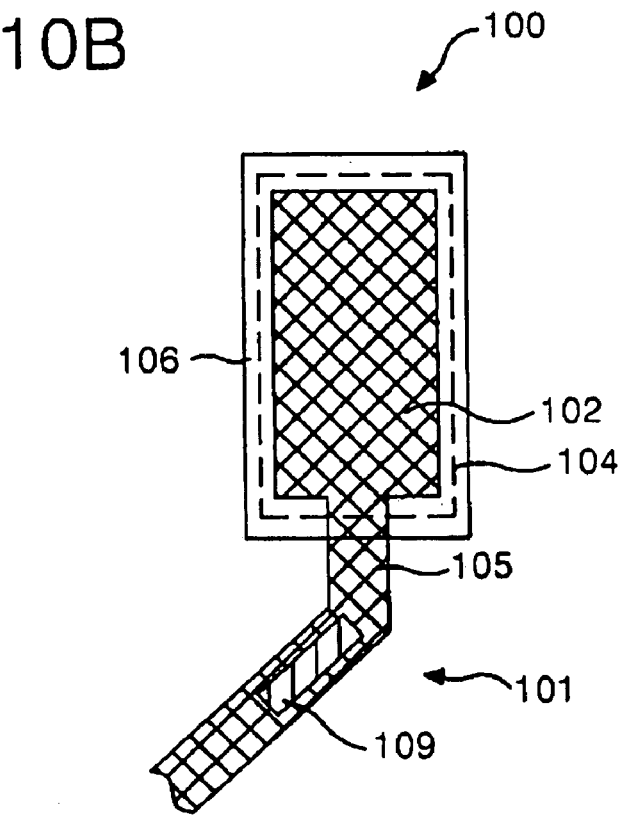

FIGS. 10A and 10B shows a link 101, which is connected to a pad 100, according to an embodiment of the present invention. The pad 100 includes a transparent electrode 106 connected to a pad portion (not shown) provided to a TCP through a contact area 104. The link 101 includes a electrode link 103 and 105 connected to a electrode pad 102 of the pad 100 and a compensating pattern 107 and 109 installed to the electrode link 103 and 105.

The electrode link 103 shown in FIG. 10A has a relatively long length, while the electrode link 105 of FIG. 10B is formed in a relatively short length. The compensating pattern 107 of FIG. 10A is formed longer than the compensating pattern 109 of FIG. 10B in a length.

The long compensating pattern 107 reduces a relatively large resistance load on the electrode link 103 having the relatively long length. Meanwhile, the short compensating pattern 109 increases a relatively small resistance of the electrode link 105 having the relatively short length. Controlling the compensating pattern 107 or 109 in the length compensates for a resistance different according to the length of the electrode link 103 or 105 to making a signal wire having an equivalent resistance.

If the compensating pattern 107 or 109 is formed on basis of an length of the electrode link 103 or 105, then is possible to compensate for a resistance difference according to the length of the electrode link 103 or 105. The large resistance of a long electrode link can be compensated by forming the compensating pattern 107 in a relatively long length. On the other hand, the small resistance value of a short electrode link can be compensated by only forming the compensating pattern 109 in a slightly short length.

The compensating pattern can be formed on a basis of a length of the electrode link to have a varied thickness or a varied width. In this case, The varied thickness or width of the compensating pattern compensates for a resistance different according to the length of the electrode link 103 or 105 to making a signal wire having an equivalent resistance.

In addition, the compensating pattern can be formed in a constant size. The compensating pattern is loaded on the electrode link 103 or 105 at least one. A number of the compensating pattern loaded on the electrode link 103 or 105 is determined according to a length of the electrode link 103 or 105. The number of the compensating pattern loaded on the electrode link 103 or 105 compensates for a resistance difference according to the length of the electrode link 103 or 105 to make a signal wire having an equivalent resistance.

Furthermore, the compensating pattern can be formed by a conductive material different according to a length of the electrode link 103 or 105. The conductive material different according to the length of the electrode link 103 or 105 compensates for a resistance difference according to the length of the electrode link 103 or 105 to make a signal wire having an equivalent resistance.

As described above, according to the present invention, the length or non-resistivity of the transparent electrode pattern or the electrode pad pattern included in the pad is differentiated to compensate a resistance difference according to the length of the electrode link, so that it becomes possible to make the electrode pad-link having an equivalent resistance.

The size (including the width and/or thickness) of the electrode link pattern can be differentiated to compensate a resistance difference according to the length of the electrode link, so that it becomes possible to make the electrode pad-link having an equivalent resistance.

Furthermore, the number or the non-resistivity of the compensating pattern loaded on the electrode link pattern can be differentiated to compensate a resistance difference according to the length of the electrode link, so that it becomes possible to make the electrode pad-link having an equivalent resistance.

Furthermore, the same initial bias voltage is applied to the corresponding signal lines owing to the electrode pad-link having the same resistance, so that it becomes possible to prevent picture quality deterioration resulting from a signal distortion caused by a resistance difference between the electrode links in the prior art.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display including a pixel area and a driving circuit, comprising:
   at least two electrode links each extended from the pixel area, the electrode links having lengths different from each other;
   at least two pad members each in contact with the driving circuit and a respective electrode link; and
   at least two patterns each in contact with a respective pad member and a respective electrode link to compensate for a resistance due to the length of the respective electrode link.

2. A liquid crystal display including a pixel area and a driving circuit, comprising:
   at least two electrode links each extended from the pixel area, the electrode links having lengths different from each other;
   at least two pad members each in contact with the driving circuit and a respective electrode link; and
   at least two patterns each in contact with a respective pad member and a respective electrode link to compensate for a resistance due to the length of the respective electrode link,
   wherein a width of each pattern varies in accordance with the length of the respective electrode link.

* * * * *